(12) United States Patent
Catlett et al.

(10) Patent No.: US 8,880,435 B1
(45) Date of Patent: Nov. 4, 2014

(54) DETECTION AND TRACKING OF UNAUTHORIZED COMPUTER ACCESS ATTEMPTS

(75) Inventors: Sean K. Catlett, Dallas, TX (US); Xu He, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1736 days.

(21) Appl. No.: 11/924,686

(22) Filed: Oct. 26, 2007

(51) Int. Cl.
*G06Q 20/00* (2012.01)

(52) U.S. Cl.
USPC .......................................................... 705/75

(58) Field of Classification Search
USPC .................................... 705/75, 16, 21, 59, 71
See application file for complete search history.

(56) References Cited

U.S. PATENT DOCUMENTS

| 6,513,014 | B1 * | 1/2003 | Walker et al. ................ 705/7.32 |
| 7,171,694 | B1 | 1/2007 | Jespersen et al. |
| 2003/0145223 | A1 * | 7/2003 | Brickell et al. ............... 713/201 |
| 2004/0193441 | A1 * | 9/2004 | Altieri ............................... 705/1 |
| 2005/0086161 | A1 * | 4/2005 | Gallant ........................... 705/39 |
| 2005/0097320 | A1 * | 5/2005 | Golan et al. ................... 713/166 |
| 2005/0160043 | A1 | 7/2005 | Reno |
| 2006/0068755 | A1 * | 3/2006 | Shraim et al. ................. 455/410 |
| 2007/0233521 | A1 * | 10/2007 | Wehba et al. ....................... 705/3 |

OTHER PUBLICATIONS

Lance Spitzner, "Honeytokens: The Other Honeypot," printed Jan. 24, 2008, http://www.securityfocus.com/print/infocus/1713, 5 pages.
Lance Sptizner, "Open Source Honeypots: Learning with Honeyd," printed Jan. 24, 2008, http://www.securityfocus.com/print/infocus/1659, 6 pages.
Honeytoken—Wlkipedia, the free encyclopedia, printed Jan. 24, 2008, http://en.wikipedia.org/wiki/Honeytoken, 2 pages.
ISR, maildate Apr. 27, 2009.

* cited by examiner

*Primary Examiner* — Dante Ravetti
(74) *Attorney, Agent, or Firm* — Banner & Witcoff, Ltd.; Michael A. Springs

(57) ABSTRACT

False honeytoken data is generated, stored, and disseminated to a criminal organization such as an online banking fraud ring. After dissemination of the data, access attempts using the false honeytoken data are identified at an online banking web server or other organization resource. Data associated with the fraudulent access attempt, such as a source IP address, physical address, or related customer account numbers, are retrieved and stored so that this data may be compiled, analyzed, and used for tracking fraud rings.

25 Claims, 5 Drawing Sheets

| DB_ID | ACCT# | TYPE | SSN | NAME | ADDR | LOGIN | PW | ATM PIN |
|---|---|---|---|---|---|---|---|---|
| XXXX | XXX XXXXX | C+S | XXX-XX... | Last Name... | XX Street Name, ... | XXLogin | XPassword | XXXX |
| XXXX | XXX XXXXX | C+S | XXX-XX... | Last Name... | XX Street Name, ... | XXLogin | XPassword | XXXX |

FIG. 4

| DB ID | HONEYTOKEN DATA USED | ACCESS TIME | SOURCE IP | AGE | PREVIOUS ATTEMPTS | RELATED ACCTS |
|---|---|---|---|---|---|---|
| XXXX | SSN, ADDRESS | 20:11:45 06/0... | XXX.XX.X.X | 13 | 1 | XXXX XXXX XX... |
| XXXX | LOGIN, PW | 03:47:15 06/1... | XXX.XX.X.X | 35 | 11 | XXXX XXXX XX |
| XXXX | ACCT#, ATM PIN | 23:04:27 06/1... | --- | 4 | 0 | --- |

FIG. 5

DETECTION AND TRACKING OF UNAUTHORIZED COMPUTER ACCESS ATTEMPTS

FIELD OF THE INVENTION

Aspects of the disclosure generally relate to detection of fraudulent activities via a computing network.

BACKGROUND

In today's fast-paced economy, more and more business transactions are conducted remotely via computer or telephone networks. In-person meetings and conventional mail, the longtime standards for performing secure transactions and making payments, have given way to remote business solutions such as online banking/bill payment and voice response units for processing customer requests via automated telephone systems. However, the vast amount of confidential information transmitted over these networks and the increasing difficulty of remotely verifying the identity of a party has led to a robust online fraud community. High-tech criminals have become experts at fraudulently acquiring sensitive information, such as social security numbers, bank account numbers and PINs, credit card numbers, and Internet login credentials (i.e., usernames and passwords) for secure business applications. Successful attempts at database hacking and network decryption, as well as fraudulent data-gathering systems such as phishing and pharming sites, vishing applications, and malicious software such as Trojan horse programs and key logging programs result in thousands of cases of identity theft against customers and cost many businesses millions of dollars per year.

In one typical scenario, a fraud organization maintains a phishing or pharming web site to impersonate a legitimate online banking application. The fraud ring may then use email or other communications along with social engineering techniques to trick legitimate banking customers into logging on to the fraudulent web site, thereby providing the organization with the customer's confidential information. Once in possession of the customer's confidential data, the fraud ring may withdrawal or transfer funds, make purchases, or use this data to obtain additional sensitive data from other bank customers or from the bank itself.

Efforts to prevent fraud generally involve adding extra layers of security, such as crosschecking bank account numbers with other personal information, creating additional PIN numbers and passwords, and storing secure data in separate locations. However, these additional layers of security increase costs for businesses, create extra hassle customers, and provide even more opportunities for fraud organizations to steal data.

Another conventional technique involves the use of 'honeytokens' to determine if secured data has been compromised by an unauthorized party. A honeytoken refers to false information (e.g., bogus account numbers, phony email addresses) that may be embedded into a database of valid legitimate information. An organization may store honeytoken data within its own systems, and then monitor network access logs and other sources to identify any external uses of the honeytoken data. Any such use indicates to the organization that its confidential data has been compromised. Thus, conventional honeytoken solutions alert organizations that they may have been victimized by fraud, and can allow the organization to determine a level of confidence in its data integrity.

However, these conventional solutions provide no techniques for defending against fraudulent attacks, or for tracking fraud activities in order to pursue and stop fraud organizations at their source. Accordingly, there remains a need for systems and methods for fraud detection and tracking in business computing systems.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to one aspect of the present disclosure, an organization generates a set of false honeytoken data entries corresponding to customer account information or other secure data, and makes the honeytoken data available to fraud rings. For example, a financial institution may create honeytoken account data, including false account numbers and online banking credentials. After the false data has been disseminated to one or more fraudulent systems, the organization can wait and monitor access attempts on its system's resources that are made using the honeytoken data. When a fraudulent access attempt is identified, the organization can then collect and store additional relevant information regarding the access attempt, such as the source IP address from which the attempt was made, related account information, or other relevant data provided by the fraudulent user. Data collected from fraudulent access attempts may be subsequently compiled and used for tracking and investigation fraud rings and related criminal organizations.

According to another aspect of the present disclosure, a financial institution or other organization using a fraud tracking system may collaborate with separate entities to perform the honeytoken seeding and law enforcement aspects of the process. For example, a bank may use an external seeder for more effective dissemination of honeytoken data into the online fraud world. The seeder may identify data gathering systems of fraud organizations and inject the honeytoken data into these systems using source IP addresses that cannot be traced back to the bank, thus rendering the honeytoken data indistinguishable from authentic customer data. Additionally, an organization may collaborate with separate law enforcement agencies to further track and investigate the fraudulent access attempts against the organization. By exchanging data with law enforcement regarding fraudulent access attempts and fraud investigations, both parties may efficiently leverage the skills and resources of the other to identify previously undetected fraudulent acts and to discover additional information about fraud organizations.

According to additional aspects of the present disclosure, a business may perform a data analysis on the compilation of fraudulent access attempt data in order to assist in the fraud investigation process. As an example, an online banking web site may cross-reference the source IP addresses of fraudulent access attempts with all other network access logs to determine if any valid customer accounts have been targeted by the same fraud ring. Additionally, determining and storing the age of the honeytoken data may provide investigators with more specific information regarding the operations of a fraud group and the techniques by which different fraud groups buy and sell confidential customer data on the black market. According to yet another aspect, the organization and/or the honeytoken seeder may perform further data analysis on the fraudulent access attempts in order to determine which types of honeytoken data and techniques for injecting the data were most commonly accepted by the fraud groups. This analysis can provide feedback to improve the honeytoken generation and dissemination techniques.

BRIEF DESCRIPTION OF THE DRAWINGS

Figure 1:
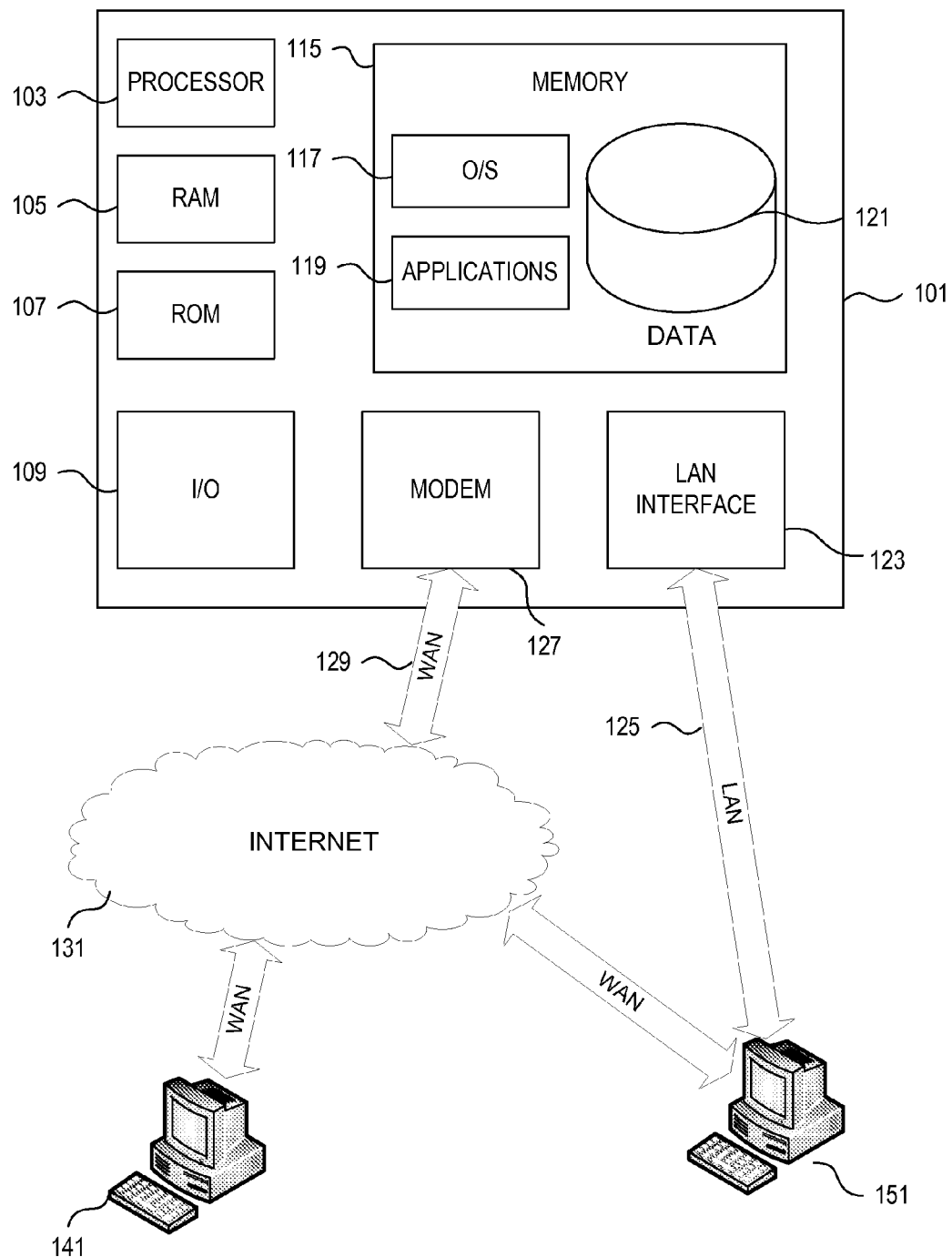
Figure 2:
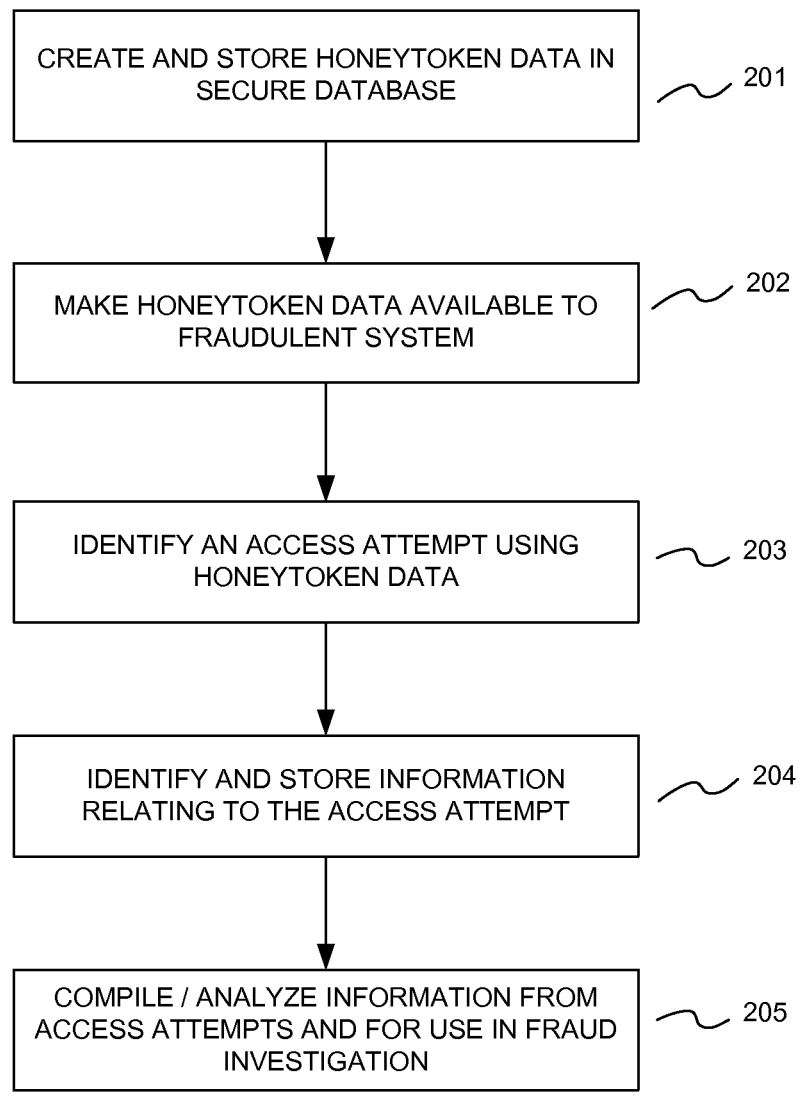
Figure 3:
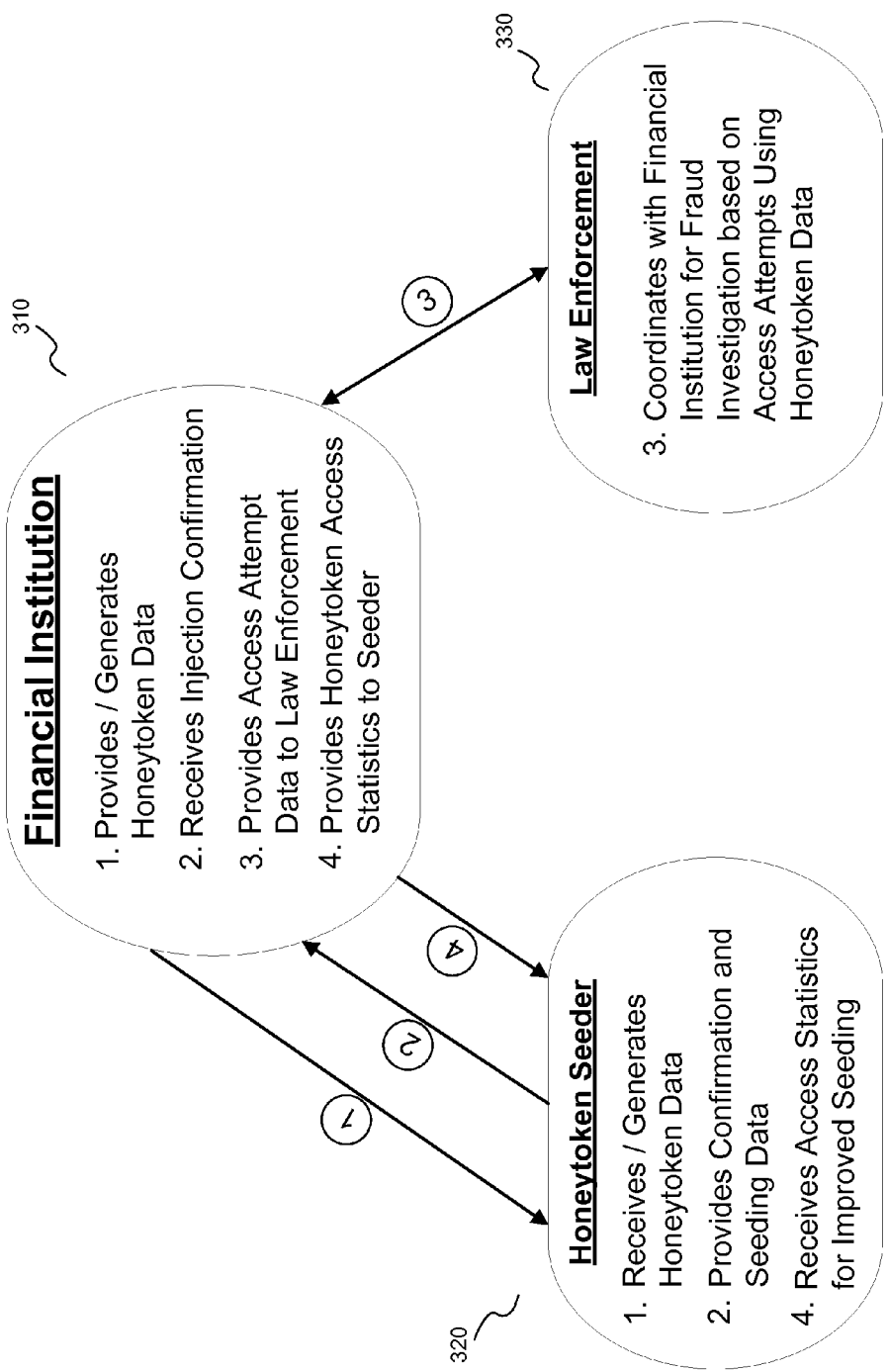

Having thus described the invention in general terms, reference will now be made to the accompanying drawings, which are not necessarily drawn to scale, and wherein:

FIG. 1 is a block diagram illustrating a computing device, in accordance with aspects of the present invention;

FIG. 2 is a flow diagram showing illustrative steps for identifying and tracking fraudulent access attempts using honeytoken data, in accordance with aspects of the present invention;

FIG. 3 is a block component diagram showing illustrative interactions between a financial institution, a honeytoken seeder, and a law enforcement entity, in accordance with aspects of the present invention;

FIG. 4 is an illustrative database table storing valid customer data and false honeytoken data, in accordance with aspects of the present invention; and FIG. 5 is an illustrative database table storing information relating to fraudulent access attempts, in accordance with aspects of the present invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 110 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

Referring to FIG. 2, an illustrative flow diagram is shown in which an organization uses honeytoken data to track fraudulent access attempts made against its resources. As described in detail below, these steps may be performed by a financial institution or other organization that stores secure customer data intending to protect their customers and their own organization infrastructure from fraud attacks. Thus, the computing device 101 may correspond to a secure web server of a financial institution, such as a bank, insurance company, or credit card company, or of a third-party vendor. The computing device 101 may be configured with software components perform at least some of the fraud detection and tracking techniques discussed in this example.

In step 201, honeytoken data may be generated and stored in a secure location maintained by the business or organization. As discussed above, honeytoken data refers to false data designed to resemble authentic customer data or organization data. In this example, a financial institution may store false honeytoken customer account in its secure customer information database 121 on web server 101. The honeytoken data in this example may include bank account numbers, social security numbers, names and contact information, e-mail addresses, account PIN numbers and ATM numbers, and network login credentials (e.g., usernames and passwords) for online banking applications. This false information may be embedded into the secure database 121 and stored in the same tables as actual valid customer data.

Referring briefly to FIG. 4, an example of a database is shown illustrating valid customer data 410 stored alongside false honeytoken data 420 in the table 400. In this example, table 400 is a compilation of banking customer data, including the following fields: bank account number, bank account type, social security number, customer name, address, online banking username and password, and an ATM PIN. As shown in FIG. 4, honeytoken data entries 420 may be formatted and stored in the database 400 similarly to valid customer account entries 410. Thus, should a malicious party come into possession of this data, for example, due to a successful database hack or after a disloyal employee sells the confidential information on the black market, then the malicious party would be unable to distinguish the false honeytoken data from the authentic customer data.

The false honeytoken data may resemble the authentic data to prevent malicious users from identifying which data entries correspond to the honeytoken data. Unfortunately, sophisticated fraud rings are adept at identifying honeytoken data. Therefore, the honeytoken data entries should not only have the same format as valid data, but may also be generated according to specific semantic rules that may better avoid detection by fraud groups. As an example, a false honeytoken account under the name "John F. Kennedy," with an address of "123 Main St. Anytown, USA," and a social security number of 9876-54-321 is unlikely to entice a sophisticated fraud group into using that data. A reusable database of honeytoken data entries may also be ineffective against fraud rings that collect and store previously used honeytokens for comparison with newly acquired data. Furthermore, if a fraud group positively identifies a honeytoken data entry, then the group might also avoid using other related data entries, such as other data originating from the same network IP address, or similarly formatted data entries received at approximately the same time or from the same geographic location. Accordingly, step 201 may involve advanced data generation techniques to produce honeytoken data that is indistinguishable from valid customer data. For example, a bank may use valid account numbers or may generate mathematically valid credit card numbers for their honeytoken data entries. Additionally, honeytoken account information may be randomly generated from census data of common names and street address, or from other available data stores. The substance of the account fields may be generated to include realistic correlations between the different data fields (e.g., an account PIN matching a birthday), in contrast to purely random and unrelated data fields which may be less realistic in certain cases.

Furthermore, sophisticated criminal organizations may have the ability to externally validate the account information before they attempt to fraudulently access the account. For example, a fraud ring in possession of facially valid account information may attempt to confirm the validity of the account through a third-party credit agency or merchant transaction to confirm the existence of funds in the account. These fraud groups may also use phone directories, customer lists, and other well-known data sources to validate customer names, addresses, and other personal account information. Thus, the generation of honeytoken data in step 201 may also involve creating an actual account, rather than simply embedding false honeytoken data into a customer database 121. As an example, a financial institution may create a valid bank account, including a positive account balance, which is enabled with electronic banking functionality. Nonetheless, this account need not be associated with any actual bank customer. It may also be configured as a frozen account or a deposit-only account to ensure that no funds are actually lost from the honeytoken account. Thus, to a fraud ring verifying account information through a credit agency, merchant account, or other source, this false honeytoken account would appear to be a valid customer account.

Additionally, it may be desired that false honeytoken data not collide, or match, with any actual customer data stored in the database 121. For example, if a randomly generated honeytoken of network credentials (e.g., a username and password) for an electronic banking system accidentally matched the username and password of an existing customer account, then both the customer's account and the banking system's data integrity may potentially be compromised. Accordingly, false honeytoken data created in step 201 may be cross-referenced against existing customer data to ensure uniqueness before the honeytoken data is stored in the customer database 121.

In step 202, the honeytoken data generated and stored in step 201 is made available to a fraudulent data-gathering system. As noted above, criminal organizations use many different techniques for obtained confidential customer data from financial institutions and other organizations. As an example, a fraud ring may create a phishing or pharming site to obtain a user's Internet login credentials or credit card number, or may use the similar practice of vishing to obtain confidential information by trick over a telephone network or VoIP connection. Additionally, malicious software installed on a customer's computer (or the business' own servers), such as a Trojan horse program or key logging program may be configured to seek out and return customer data to fraudulent organizations.

Accordingly, making honeytoken data available to fraudulent users in step 202 may involve interaction with many different varieties of malicious data gathering programs. As an example, a bank may become aware of a phishing site operated by a fraud ring to trick the bank's customers into entering their secure information into the phishing site. In this example, step 202 may involve connecting to the phishing site and directly entering honeytoken data into the user interface. Other techniques for making honeytoken data available to fraud groups depend on which data gathering tools that the fraud group is using. Providing honeytoken data to fraud systems may be a fully automated task or may involve one or more manual steps.

When making honeytoken data available in step 202, a business or organization may want to provide many different honeytoken data sets with different characteristics, resulting in an increased chance that the fraudulent system will accept and use at least some of the honeytoken data sets, even though others may be identified as honeytokens and discarded. Additionally, as described below in reference to FIG. 3, the organization may collaborate with an external seeder to provide the honeytoken data to fraud groups, so that the data appears more authentic.

In step 203, an attempt to access an organization resource using the honeytoken data is identified. For example, a fraudulent user may attempt to logon to the online banking site of a financial institution using credentials matching one of the honeytoken data entries generated by the institution in step 201. In this example, the fraudulent access attempt may be denied by the bank's web server 101, and may be subsequently flagged by a scheduled process that scans the network access logs of the web server 101 to search for login credentials matching honeytoken data. In other examples, access attempts by fraud groups may take different forms depending on the customer support tools provided by the organization. For instance, a fraud group may attempt to access a customer account in-person (e.g., impersonating a bank customer at a branch location for a bank teller, or by using an ATM), or over the phone, or by way of a third party (e.g., credit agency or merchant), or via a web site or other remote computer access method, or using other methods supported by the organization's infrastructure.

When an access attempt occurs in step 203, the organization resource (e.g., web server 101) might immediately deny access and return an error message to the fraudulent user. One standard error message may indicate that the login credentials do not correspond to a valid user account. However, the web server 101 may be configured to return an alternative error message when an access attempt using honeytoken data is detected. For example, this error message might indicate that the system is down for routine maintenance, as a way of enticing fraudulent users into making additional access attempts with the same honeytoken data, and thereby allowing the business to gather even more information about the fraud group as described below in step 204.

In step 204, the organization identifies additional information regarding the access attempt and/or the fraudulent user, and then stores this information for subsequent fraud tracking and investigation. As discussed above, the type of information collected in step 204 may depend on the type of access methods employed by the fraudulent user. Continuing the previous example, if a fraud ring attempts to log onto a secure online banking web site using a honeytoken username and password, the organization may identify this attempt and may store the source IP address of the computer from which the access attempt was initiated. The organization may store the time and duration of the fraudulent access attempt, the different web pages visited, and any other data entered into the system by the fraudulent user. Additionally, in different types of access attempts, it may be possible to collect other types of information about the fraudulent user or group. As another example, if a user attempts to fraudulently access an account by making a purchase through a third-party merchant, then the business may become aware of the physical address of the merchant, and potentially the name, contact information, and physical address (e.g., shipping or delivery location) of the fraudulent user.

As described above, fraudulent access attempts using honeytoken data may be denied immediately in order to protect the businesses resources and customer account integrity. However, for systems where fraudulent access attempts can be identified in real time, other responses may be returned to fraudulent users to provide the appearance of a successful login so that even more information about the fraud group may be obtained. For example, when a user attempts to logon to an online banking web site using honeytoken data, the bank's web server 101 may be configured to check the user's access credentials against a list of honeytoken data entries to quickly determine that the logon attempt is fraudulent. At this point, rather than simply denying the access request, the server 101 may return an interface to give the fraudulent user the appearance that the login attempt has been successful. Thus, the fraudulent user may be convinced that he has gained access to a customer account, and may attempt to transfer or withdraw accounts funds, or perform other secure customer functions through the online banking website. Thus, any additional information he may enter into the subsequent user interfaces, for example, destination account numbers for funds transfers, names, physical addresses, or other contact information, may be collected and stored by the server 101 and used in a subsequent fraud investigation.

As described above, when a fraudulent access attempt occurs, the organization may succeed in collecting a variety of different types of information relating to the access attempt and/or the fraud group. In step 205, this information may be stored, compiled, and analyzed for use in a fraud investigation. As an example, a financial institution may maintain a secure database 121 for logging and tracking all fraudulent access attempts, including the time, honeytoken data, and source IP address associated with the access attempt. Additionally, by running a correlation analysis between honeytoken and non-honeytoken access attempts, it may be possible to identify valid customer accounts that have been victimized by the same fraud group.

The process of compiling information in step 205 may include determining the 'age' of the honeytoken data at the time of the fraudulent access attempt. The age of a honeytoken refers to the amount of time since the honeytoken data was first made available to a fraudulent system. After honeytoken data has been obtained by a criminal or fraud group, it may be sold and resold to different groups in the online fraud world. Therefore, a single piece of honeytoken data may continue to provide valuable information to an organization for a period of weeks or months after it is first disseminated to a fraudulent system. In general, a honeytoken data entry may degrade in quality over time, because the more sophisticated fraud groups are unlikely to use stale customer data obtained from the Internet or another fraud group, and are also unlikely to reuse their own honeytoken data many different times. Therefore, by storing the date that honeytoken data entry was made available to a fraud ring, and then calculating the number of access attempts with the honeytoken and the age of the honeytoken at each access attempt, it may be possible to determine the sophistication level of fraudulent users and groups, and to track the illegal sale of honeytoken data from one fraud group to another.

Finally, as described below, the business or organization may provide the data obtained in step 203 and the results of the compilation and analysis performed in step 204 to an external law enforcement agency for additional fraud investigation.

Referring to FIG. 3, a component diagram is shown of an illustrative system for tracking fraud using honeytoken data. In this example, a financial institution (e.g., bank) 310 collaborates with an external honeytoken seeder 320 and a law enforcement agency 330 to track and investigate fraud attempts against the financial institution 310. As shown in step 1 of FIG. 3, the bank 310 provides honeytoken information to the seeder 320 for dissemination to systems in the online fraud world. In this step, the bank 310 may generate all of its own honeytoken data and provide that data to the seeder 320 in its final form. Alternatively, the bank 310 may provide the seeder 320 with sample (or actual) customer information from its databases, from which the seeder 320 may generate the honeytoken data on behalf of the bank for dissemination. Thus, the parties may coordinate to determine who will generate the honeytoken data based on cost and convenience to the parties, the level of expertise and the quality and authenticity of the honeytoken data produced by the respective parties, and security concerns relating to data transfers of actual or honeytoken data. Irrespective of which party creates the honeytoken data, it may be advantageous to have the seeder 320 inject the data into the fraudulent systems, including phishing and pharming sites, vishing applications, and Trojan horse or key logging programs. As noted above, many fraud organizations have sophisticated techniques for distinguishing between authentic customer data and honeytoken data. For example, a fraud ring may store the source IP addresses of all data entries made into its phishing web site and then compare those addresses to a known set of IP addresses corresponding to the bank's 310 computer systems. Thus, using an external seeder 320 may hide the source of the honeytoken data, making the data appear more authentic to fraud groups.

In step 2 of FIG. 3, after the seeder 320 has injected the honeytoken data into a fraudulent system (as described in step 202 of FIG. 2), the seeder 320 may initiate communication with the bank 310 to confirm the dissemination of the data. During this communication, the seeder 320 may also provide other relevant information to be stored in the bank's 310 database, such as a finalized copy of the honeytoken data entries and the date on which each honeytoken was injected. This data may be stored by the bank 310 or the seeder 320 for subsequent use to identify and analyze the fraudulent access attempts.

In step 3 of FIG. 3, after the bank 310 has identified and stored information relating to one or more fraudulent access attempts (as described in steps 203-04 of FIG. 2), the bank 310 may provide this information to a law enforcement agency 330 as part of an online fraud investigation. During the investigation, the law enforcement agency 330 may also provide relevant information to the bank 310, for example, other bank account numbers or source IP addresses that have been identified in connection with fraud attempts. The bank 310 and agency 330 may exchange information frequently to more efficiently leverage the each entity's skills and resources.

An example of the type information provided by a bank 310 to a law enforcement agency 330 is shown in FIG. 5. Referring briefly to FIG. 5, the database table 500 includes summaries of three different fraudulent attempts to access the bank's 310 web server. In this example, the bank 310 has recorded three separate fraudulent access attempts 510-530. For each fraudulent attempt, the bank 310 identifies and stores the honeytoken record number, the specific honeytoken data fields used, the time of the access attempt, the source IP address of the access attempt, the age of the honeytoken data at the time of the attempt, the number of previous access attempts made with this same honeytoken data, and related customer accounts associated with the access attempt.

In step 4 of FIG. 3, the bank 310 may deliver fraudulent access attempt statistics to the seeder 320, effectively providing the seeder 320 with feedback regarding the honeytoken data that it has previously disseminated. As discussed above, a honeytoken seeder 320 may use a variety of data formats, injection techniques, and may connect to a variety of fraudulent systems when disseminating honeytoken data. As an example, a seeder 320 that receives a data set of 1000 honeytoken account numbers from a bank 310 might choose to inject 200 account numbers into each of five different phishing sites, using different techniques for injecting the data at each site. However, when the data is first disseminated, the seeder 320 does not know which phishing sites and which injection techniques will prove most effective in enticing fraud rings to accept and use the honeytoken data. Therefore, by comparing the fraud attempt statistics received from the bank 310 with its own honeytoken injection records, the seeder 320 may be able to determine which phishing sites and techniques were most effective. These statistics may allow the seeder 320 to improve the honeytoken seeding process for various fraud systems, such as phishing and pharming sites, vishing applications, Trojan horse programs, and key logging programs.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method of tracking unauthorized computer access attempts using honeytoken data, the method comprising:
   storing, by a computing device, honeytoken data in a secure customer information database comprising authentic customer data of a financial institution;
   identifying, by the computing device, a format of the authentic customer data of a financial institution;
   saving, by a computing device, the honeytoken data in the same format as the identified authentic customer data in the secure customer information database, and wherein the honeytoken data is not associated with an existing customer of the financial institution;
   identifying, by the computing device, a login attempt at a web site of the financial institution;
   determining, by the computing device, that credentials used in the login attempt correspond to the honeytoken data;
   based on the determination that the honeytoken data was used in the login attempt, providing, by the computing device, a user interface indicating that the credentials used in the login attempt are valid;
   receiving, by the computing device, additional data via the web site of the financial institution relating to the login attempt; and
   storing, by the computing device, the additional data relating to the login attempt.

2. The method of claim 1, further comprising:
   identifying an externally created software application configured to gather customer information; and
   making the honeytoken data available to the externally created software application.

3. The method of claim 2, wherein making the honeytoken data available to the externally created software application comprises:
   providing the honeytoken data to one or more of a phishing site, a pharming site, a vishing application, a Trojan horse program, and a keystroke logging program.

4. The method of claim 2, wherein making the honeytoken data available comprises providing the honeytoken data to a third party that delivers the honeytoken data to the externally software application using a network source address that is not affiliated with the financial institution.

5. The method of claim 1, further comprising:
   storing by the computing device an initial availability date associated with the honeytoken data, before identifying the login attempt;
   determining an age of the honeytoken data based on a time associated with the login attempt and the initial availability date, after identifying the login attempt; and
   storing, by the computing device, the age of the honeytoken data with the additional data relating to the login attempt.

6. The method of claim 1, further comprising creating a valid account within the secure customer information database corresponding to the honeytoken data that is not associated with a customer of the financial institution, wherein providing the user interface comprises providing online access to said valid account.

7. The method of claim 6, wherein creating the valid account within the secure customer information database comprises:
creating a deposit-only account or an account with restricted access to money transfers and withdrawals within the secure customer information database.

8. The method of claim 1, wherein the honeytoken data comprises one or more of a social security number, a customer account number, and network login credential information.

9. A computing device that detects and tracks unauthorized computer access attempts, the computing device comprising:
a processor controlling at least some operations of the computing device; and
a memory storing computer executable instructions that, when executed by the processor, causes the processor to perform the steps of:
storing honeytoken data in a secure customer information database comprising authentic customer data of a financial institution;
identifying a format of the authentic customer data of a financial institution;
saving the honeytoken data in the same format as the identified authentic customer data in the secure customer information database, and wherein the honeytoken data is not associated with an existing customer of the financial institution;
identifying a login attempt at a web site of the financial institution;
determining that credentials used in the login attempt correspond to the honeytoken data;
based on the determination that the honeytoken data was used in the login attempt, providing a user interface indicating that the credentials used in the login attempt are valid;
receiving additional data via the web site of the financial institution relating to the login attempt; and
storing the additional data relating to the login attempt.

10. The computing device of claim 9, the memory storing further computer executable instructions that, when executed by the processor, cause the processor to perform the steps of:
identifying an externally-created software application configured to gather customer information; and
making the honeytoken data available to the externally created software application.

11. The computing device of claim 10, wherein the externally-created software application comprises one or more of a phishing site, a pharming site, a vishing application, a Trojan horse program, and a keystroke logging program.

12. The computing device of claim 10, wherein making the honeytoken data available comprises providing the honeytoken data to a third party that delivers the honeytoken data to the externally-created software application using a network source address that is not affiliated with the financial institution.

13. The computing device of claim 9, the memory storing further computer executable instructions that, when executed by the processor, cause the processor to perform the steps of:
storing an initial availability date associated with the honeytoken data;
determining an age of the honeytoken data based on a time associated with the login attempt and the initial availability date, after identifying the login attempt; and
storing the age of the honeytoken data with the additional data relating to the login attempt.

14. The computing device of claim 9, the memory storing further computer executable instructions that, when executed by the processor, cause the processor to perform the steps of:
creating a valid account within the financial institution corresponding to the honeytoken data that is not associated with a customer of the financial institution, wherein providing the user interface comprises providing online access to said valid account.

15. The computing device of claim 14, wherein the valid account is a deposit-only account or an account with restricted access to money transfers and withdrawals.

16. The computing device of claim 9, wherein the honeytoken data comprises one or more of a social security number, a customer account number, and network login credential information.

17. One or more non-transitory computer-readable media storing computer-executable instructions which, when executed on a computer system, causes the computer system to perform the steps of:
storing honeytoken data in a secure customer information database comprising authentic customer data of a financial institution;
identifying a format of the authentic customer data of a financial institution;
saving the honeytoken data in the same format as the identified authentic customer data in the secure customer information database, and wherein the honeytoken data is not associated with an existing customer of the financial institution;
identifying a login attempt at a web site of the financial institution;
determining that credentials used in the login attempt correspond to the honeytoken data;
based on the determination that the honeytoken data was used in the login attempt, providing a user interface indicating that the credentials used in the login attempt are valid;
receiving additional data via the web site of the financial institution relating to the login attempt; and
storing the additional data relating to the login attempt.

18. The non-transitory computer-readable media of claim 17, wherein the computer-executable instructions, when executed on the computer system, causes the computer system to perform the steps of:
identifying an externally-created software application configured to gather customer information; and
making the honeytoken data available to the externally created software application.

19. The non-transitory computer-readable media of claim 18, wherein the externally-created software application comprises one or more of a phishing site, a pharming site, a vishing application, a Trojan horse program, and a keystroke logging program.

20. The non-transitory computer-readable media of claim 17, wherein the computer-executable instructions, when executed on the computer system, causes the computer system to perform the steps of:
storing an initial availability date associated with the honeytoken data, before identifying the login attempt;
determining an age of the honeytoken data based on a time associated with the login attempt and the initial availability date, after identifying the login attempt; and
storing the age of the honeytoken data with the additional data relating to the login attempt.

21. The non-transitory computer-readable media of claim 17, wherein the honeytoken data comprises one or more of a social security number, a customer account number, and network login credential information.

22. The method of claim 1, wherein receiving the additional data received relating to the login attempt comprises:
   determining a source Internet Protocol (IP) address associated with the login attempt; and
   receiving a financial account number received via user input after the login attempt.

23. The computing device of claim 9, wherein receiving the additional data received relating to the login attempt comprises:
   determining a source Internet Protocol (IP) address of the login attempt; and
   receiving a financial account number received via user input after the login attempt.

24. The method of claim 1, wherein providing the user interface comprises returning an alternative error message that does not indicate that the credentials used in the login attempt are invalid.

25. The computing device of claim 9, wherein providing the user interface comprises returning an alternative error message that does not indicate that the credentials used in the login attempt are invalid.

* * * * *